No. 868,006. PATENTED OCT. 15, 1907.
B. H. PUGH.
POTATO DIGGER.
APPLICATION FILED JAN. 25, 1907.
2 SHEETS—SHEET 1.
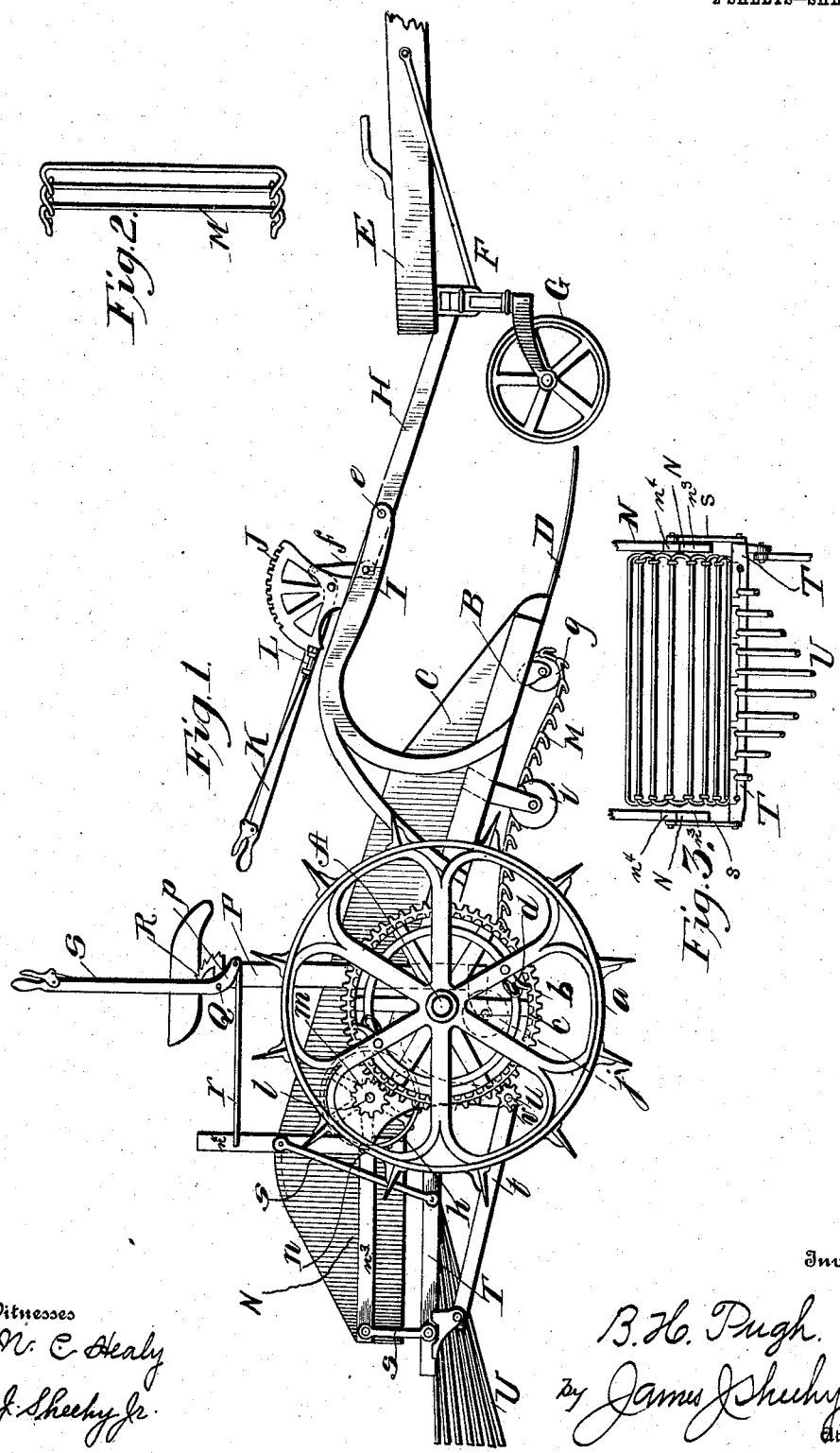
Witnesses
N. C. Healy
J. J. Sheehy Jr.
Inventor
B. H. Pugh.
by James J. Sheehy
Attorney No. 868,006. PATENTED OCT. 15, 1907.
B. H. PUGH.
POTATO DIGGER.
APPLICATION FILED JAN. 25, 1907.
2 SHEETS—SHEET 2.
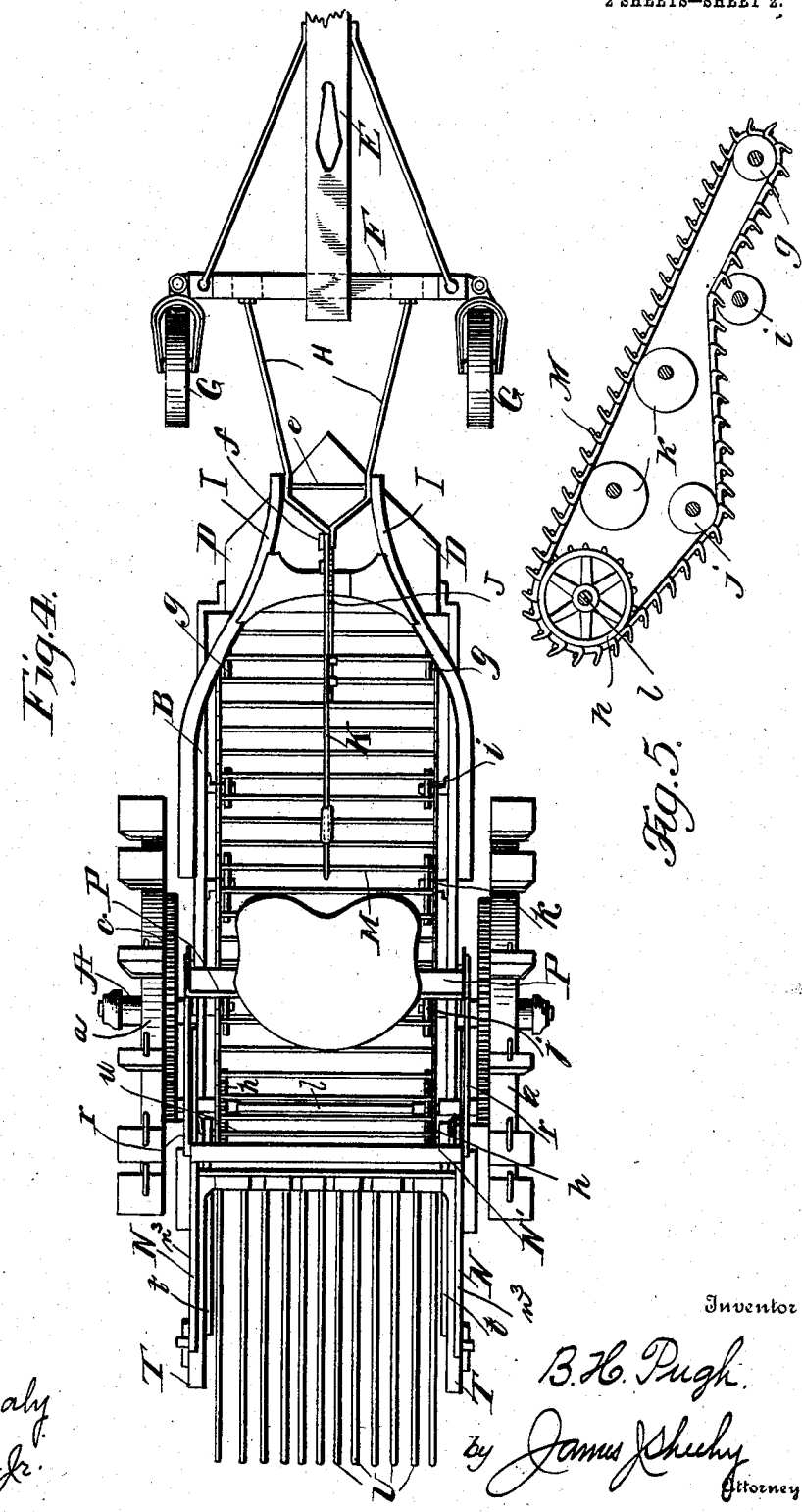
Witnesses
N. C. Healy
J. J. Sheehy Jr.
Inventor
B. H. Pugh.
by James J. Sheehy
Attorney

UNITED STATES PATENT OFFICE.

BURTON H. PUGH, OF TOPEKA, KANSAS.

POTATO-DIGGER.

No. 868,006.

Specification of Letters Patent.

Patented Oct. 15, 1907.

Application filed January 25, 1907. Serial No. 354,161.

*To all whom it may concern:*

Be it known that I, BURTON H. PUGH, a citizen of the United States, residing at Topeka, in the county of Shawnee and State of Kansas, have invented new and useful Improvements in Potato-Diggers, of which the following is a specification.

My invention pertains to potato diggers; and it has for its general object to provide a potato digger which is, at once, light and strong, easy of draft, and possessed of large capacity in proportion to its size.

The invention will be fully understood from the following description and claims when the same are read in connection with the accompanying drawings, forming part of this specification, in which:

Figure 1 is a side elevation of my novel potato digger. Fig. 2 is a view showing in detail a portion of the endless apron for elevating and conveying the potatoes rearwardly and separating dirt therefrom. Fig. 3 is a detail view showing the arrangement of the tines of the shaking discharge device of the machine. Fig. 4 is a top plan view of the machine. Fig. 5 is a detail view showing the apron in side elevation as properly arranged relative to the several sprockets and idlers.

Similar letters designate corresponding parts in all of the views of the drawings, referring to which:

A is the axle of the machine on which are loosely mounted supporting and driving wheels $a$. On the said shaft A at points adjacent to the wheels $a$ are loosely mounted spur gears $b$ provided with internal ratchet teeth $c$ for the engagement of spring backed pawls $d$ carried by the wheels $a$, this in order to allow freedom of motion to the wheels $a$ incident to backing or turning of the machine.

B B are side bars which together with fenders C thereon form the body of the machine. The said body is rested in the usual manner on the axle A and is provided at its forward end with the ordinary shovel D for taking potatoes from the ground.

E is the pole of the machine, and F is a truck fixed to the pole and having for its office to support the forward portion of the body. The said truck F is provided at its ends with caster wheels G to facilitate turning of the machine at the ends of a field; and it is connected with the side bars B of the body through the medium of draw-bars H and beams I. The beams I are fixed to and extend upward and forward from the side bars B of the body and carry a segmental rack J and a lever K provided with a detent L for engaging the rack J, while the draw-bars H are pivoted at $e$ to the beams I and are connected through a link $f$ with the lower and forward arm of the lever K. Thus it will be apparent that the forward portion of the machine body may be raised and lowered and adjustably fixed at various heights as conditions require.

M is the endless apron for receiving potatoes and dirt from the shovel D and carrying the potatoes upward and rearward and separating dirt from the potatoes while the latter are *en route* to the rear portion of the machine. The said apron is preferably of the specific construction best shown in Fig. 2, and is carried around parallel idlers $g$ at the forward end of the body and around parallel sprocket gears $h$ in the rear portion of the body. It will also be seen that the lower stretch of the apron M passes over parallel idlers $i$ and parallel idlers $j$ arranged in rear of the idlers $i$ while the upper stretch passes over eccentric idlers $k$, Fig. 4, this latter to assure the upper stretch of the belt being shaken or agitated with a view of assisting in the separation of dirt from the potatoes. The sprocket gears $h$ are fixed on a transverse shaft $l$ on which are also fixed pinions $m$, intermeshed with the spur gears $b$, whereby it will be seen that the apron M is driven from the supporting and driving wheels $a$.

N, N are vertically swinging, bell-crank frames pivoted at $n$ on opposite sides of the rear portion of the machine body, and having horizontal arms $n^3$ and vertical arms $n^4$, the vertical arms being connected together by a cross-bar N', Fig. 4. P is a seat-support fixed to and rising from the body. Q is a transverse shaft mounted on said seat-support and having arms $p$ at its ends, connected through links $r$ with the vertical arms $n^4$ of the bell-crank frames N. R is a segmental rack fixed on the seat-support P, and S is a lever fixed on the shaft Q and having the usual detent to engage the rack R. By virtue of this construction it will be seen that the bell-crank frames N may be raised and lowered and adjustably fixed in various positions in order to properly position the shaking discharge device of the machine, which discharge device is carried by said frames N as will now be explained.

T is the frame of the discharge device which is U-shaped and arranged horizontally as shown. This frame T is connected by swinging hangers $s$ with the frames N, and is also connected through pitmen $t$ with the crank portion of a shaft $u$, Fig. 4, which shaft $u$ is provided with pinions $v$ intermeshed with the spur gears $b$, whereby it will be seen that when the machine is in motion the frame T will be swung fore and aft. In addition to the frame T, the shaking discharge of the machine comprises tines U which are fixed to and extend rearward from the forward or cross-bar of the frame. These tines U are arranged as best shown in Fig. 3—that is to say, the middle tines are inclined downward to a greater extent than the others and such others are inclined downward in a lesser degree as they approach the side arms of the frame T. From this it follows that the chute formed by the tines is of V-shape in cross-section, and consequently the potatoes received on the chute from the rear portion of the apron M will be deposited on the ground in a narrow row so as to render easy the subsequent gathering of the potatoes.

It will be apparent from the foregoing that the shaking of the discharge formed by the frame T and the tines U will serve to separate dirt from the potatoes and to facilitate the passage of the potatoes from the machine.

It will be gathered from the foregoing that my novel potato-digging machine is light in weight and easy on the draft animals, and that it is possessed of large capacity and may be readily adjusted to meet the requirements of different conditions of soil.

The construction herein shown and described constitutes the preferred embodiment of my invention, but it is obvious that in practice such changes in the form, construction and relative arrangement of parts may be made as fairly fall within the scope of the appended claims.

Having described my invention, what I claim and desire to secure by Letters-Patent, is:

The combination in a potato digger, of a body, wheels supporting the body, a shovel carried by the body, an endless apron carried by the body and arranged to receive potatoes from the shovel and convey the same upward and rearward, a transverse crank shaft mounted in the body, gearing intermediate one of the supporting wheels and said crank shaft, vertically swinging bell-crank frames pivoted at the apices of their angles to the body and each having a horizontal, rearwardly extending arm and an upwardly extending vertical arm, a cross bar connecting the vertical arms of said frames, a seat support fixed to and rising from the body, a transverse shaft mounted on said seat support and having arms at its ends, links connecting said arms with the vertical arms of the bell-crank frames, means for adjusting and adjustably fixing the said transverse shaft, a shaking discharge device arranged below the bell-crank frames and comprising a horizontal U-shaped frame and tines extending rearward from the forward cross-bar of said frame, swinging hangers connecting the horizontal and vertical arms of the bell-crank frames and the side bars of the frame of the shaking device, and pitmen connecting the said frame and the said crank-shaft.

In testimony whereof I have hereunto set my hand in presence of two subscribing witnesses.

BURTON H. PUGH.

Witnesses:
T. F. DORAN,
BENNETT WHEELER.